United States Patent
Gan et al.

(10) Patent No.: US 6,743,547 B2
(45) Date of Patent: Jun. 1, 2004

(54) PELLET PROCESS FOR DOUBLE CURRENT COLLECTOR SCREEN CATHODE PREPARATION

(75) Inventors: Hong Gan, East Amherst, NY (US); Sally Ann Smesko, North Tonawanda, NY (US); Esther S. Takeuchi, East Amherst, NY (US)

(73) Assignee: Wilson Greatbatch Ltd., Calrence, NY (US)

( * ) Notice: Subject to any disclaimer, the term of this patent is extended or adjusted under 35 U.S.C. 154(b) by 268 days.

(21) Appl. No.: 10/054,584

(22) Filed: Nov. 13, 2001

(65) Prior Publication Data

US 2002/0081492 A1 Jun. 27, 2002

Related U.S. Application Data

(60) Provisional application No. 60/252,161, filed on Nov. 17, 2000.

(51) Int. Cl.[7] .................................................. H01M 4/00
(52) U.S. Cl. .................... 429/128; 429/241; 429/219; 429/231.5; 429/231.7; 429/220; 429/224; 429/231.1; 429/218.1; 429/245; 429/233
(58) Field of Search ................................. 429/128, 241, 429/219, 231.5, 231.7, 220, 224, 231.1, 218.1, 245, 233

(56) References Cited

U.S. PATENT DOCUMENTS

| | | |
|---|---|---|
| 4,166,870 A | 9/1979 | Henson |
| 5,478,666 A | 12/1995 | Plichta et al. |
| 5,489,492 A | 2/1996 | Asami et al. |
| 5,580,685 A | 12/1996 | Schenk |
| 5,639,577 A | 6/1997 | Takeuchi et al. |
| 5,714,283 A | 2/1998 | Briscoe et al. |

*Primary Examiner*—Laura Weiner
(74) *Attorney, Agent, or Firm*—Michael F. Scalise

(57) ABSTRACT

An electrode having the configuration: first active material/current collector/second active material is described. One of the electrode active materials in a cohesive form of active particles being firmly held together as part of the same mass is incapable of moving through the current collector to the other side thereof. However, in an un-cohesive form of active particles not being firmly held together as part of a mass, the one electrode active material is capable of communication through the current collector. The other or second active material is in a form in-capable of communication through the current collector, whether it is in a cohesive or un-cohesive powder form. Then, the assembly of first active material/current collector/second active material is pressed from either the direction of the first electrode active material to the second electrode active material, or visa versa.

18 Claims, No Drawings

PELLET PROCESS FOR DOUBLE CURRENT COLLECTOR SCREEN CATHODE PREPARATION

CROSS-REFERENCE TO RELATED APPLICATION

The present application claims priority on provisional application Serial No. 60/252,161, filed Nov. 17, 2000.

BACKGROUND OF THE INVENTION

1. Field of Invention

This invention relates to the conversion of chemical energy to electrical energy. In particular, the current invention relates to a new sandwich electrode design and a process for manufacturing the same. Sandwich electrodes are useful as the cathode in primary lithium cells and as the positive electrode in secondary lithium ion cells. These designs make such cells particularly useful for powering implantable medical devices.

2. Prior Art

Early medical devices in many cases used at least two lithium electrochemical cells in series as their power source. However, the electronic circuits in these devices now consume less energy than before. This makes it currently possible to use a single lithium cell as a reliable power source. With a unitary cell design, the requirement for high power density in many applications is even greater as the result of lowered pulsing voltage. Thus, a large electrode surface area is needed to accomplish this requirement. However, as the electrode surface area increases, more inert materials (current collector, separator, etc.) are introduced into the system. As a result, the cell's volumetric capacity is decreased. Another concern is medical device longevity, which is dependent on the cell's capacity and power efficiency.

An attempt to use high capacity materials, such as $CF_x$, by mixing it with a high rate cathode material, such as SVO, is reported in U.S. Pat. No. 5,180,642 to Weiss et. al. However, electrochemical cells made with these cathode composites have relatively lower rate capability. The benefit of increasing the cell theoretical capacity by using $CF_x$ as part of the cathode mix is balanced, in part, by lowering its power capability in a high rate discharge application, such as is encountered in an implantable cardiac defibrillator.

A significant solution to this problem is described in U.S. patent application Ser. No. 6,551,747 to Gan entitled Sandwich Cathode Design For Alkali Metal Electrochemical Cell With High Rate Capability by Gan et al., which is assigned to the assignee of the current invention and is incorporated herein by reference. This application describes a new sandwich electrode design using silver vanadium oxide (SVO) and a fluorinated carbon $(CF_x)$. An exemplary sandwich electrode has the following configuration:

SVO/current collector screen/$CF_x$/current collector screen/SVO.

However, if the openings in the current collector screen are too large, there can be communication of one of the active materials to the other side of the current collector during the manufacturing process. This "contamination" is undesirable as it detracts from discharge performance. Specifically, SVO is of a higher rate capability, but a lower energy density than $CF_x$. Therefore, contamination of the interface between the current collector and one of the active materials by the other is undesirable as it defeats the purpose of having the respective active materials segregated on opposite sides of the current collector in the first place.

SUMMARY OF THE INVENTION

To maintain the improved discharge capability of a cell containing a sandwich electrode, it is necessary to maintain direct contact of both the first and second electrode materials with the opposed sides of the current collector. A good contact or adhesion translates into good interfacial conductivity during discharge. Although it is clear in theory, in practice this interfacial conductivity is highly influenced by the manufacturing methods or processes. When the current collector is a screen, it is possible for some of one of the electrode materials to pass through the current collector openings and become trapped between the other electrode material and the current collector. This leads to decreased interfacial conductivity between the current collector and the "contaminated" first electrode material.

Thus, the present process consists of having one of the electrode active materials in a cohesive form incapable of moving through the current collector to the other side thereof. However, in an un-cohesive form, the one electrode active material is capable of communication through the current collector. The other or second active material is in a form in-capable of communication through the current collector, whether it is in a powder form, or not. Then, the assembly of first active material/current collector/second active material is pressed from either the direction of the first electrode active material to the second electrode active material, or visa versa.

In that respect, the present invention is directed to an electrochemical cell, comprising: an anode; a cathode, wherein at least one of the anode and the cathode is characterized as having been formed by a method consisting essentially of: positioning a first electrode active material into a pressing fixture; positioning a first current collector screen on top of the first electrode active material; positioning a second electrode active material on top of the first current collector screen; positioning a second current collector screen on top of the second electrode active material; positioning a third electrode active material on top of the second current collection screen, thereby forming an electrode assembly; and pressing the electrode assembly to form the electrode; and a separator electrically insulating the anode from the cathode; and an electrolyte activating the anode and the cathode, wherein when the first and third electrode active materials are in an un-cohesive state, they are of an un-cohesive size less than an opening size of at least one opening of the current collector screen and capable of moving through the at least one opening, and wherein the first and third electrode active materials are in a cohesive form incapable of moving through the at least one opening in the current collector screen and wherein the second electrode active material is in a form incapable of moving through the at least one opening in the current collector screen, and the electrode assembly is characterized as having been pressed from the direction of either the first electrode active material to the third electrode active material or from the direction of the third electrode active material to the first electrode active material.

These and other objects of the present invention will become increasingly more apparent to those skilled in the art by reference to the following description.

DETAILED DESCRIPTION OF THE PREFERRED EMBODIMENTS

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions which migrate from the negative electrode to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.18, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ having silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, $FeS$, $FeS_2$, copper oxide, copper vanadium oxide, and mixtures thereof are contemplated as useful active materials.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To charge such secondary cells, lithium ions comprising the positive electrode are intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

The above described cathode active materials, whether of a primary or a secondary chemistry, are formed into a sandwich electrode body for incorporation into an electrochemical cell by mixing one or more of them with a binder material. Suitable binders are powdered fluoro-polymers, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

According to the present invention, two different ones of the above cathode active materials, whether of a primary or a secondary chemistry, are contacted to opposite sides of a current collector. Preferably, the first active material on the side of the current collector facing the anode is of a lesser energy density, but of a greater rate capability than the second active material on the opposite side of the current collector and spaced from the anode. In other words, the exemplary second cathode active material never directly faces the lithium anode.

A preferred first cathode active material having a greater rate capability, but a lesser energy density is of a mixed metal oxide such as SVO or CSVO. This material is typically provided in a formulation of, by weight, about 94% SVO and/or CSVO, 3% binder and 3% conductive diluent as the formulation facing the anode. The second active material in contact with the other side of the current collector is, for example, $CF_x$. This material is preferably provided in a second active formulation having, by weight, about 91% $CF_x$, 5% binder and 4% conductive diluent.

Suitable current collectors are selected from the group consisting of stainless steel, titanium, tantalum, platinum, gold, aluminum, cobalt nickel alloys, highly alloyed ferritic stainless steel containing molybdenum and chromium, and nickel-, chromium- and molybdenum-containing alloys. The preferred current collector material is titanium, and most preferably the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

Therefore, one exemplary cathode assembly has the active material formulations short circuited to each other by parallel connection through the current collectors with the following configuration:

SVO/current collector screen/$CF_x$/current collector screen/SVO.

Another exemplary cathode assembly has the following configuration:

SVO/current collector screen/$CF_x$, wherein the anode is of lithium and the SVO faces the anode.

When the openings in the current collector screen are of a greater size than the particle size of one of the active materials, it is possible for some of that active material to move through the openings and "contaminate" the contact interface between the current collector and the other active material. The specific nature of the contaminating material is not necessarily important in terms of whether it is the one having the greater energy density, but the lesser rate capability, or the other. The point is that any contamination of the active material/current collector interface by the other active material is undesirable.

According to one embodiment of the present invention, when one of the first and the second active materials is in an un-cohesive state and of a size less than that of at least one opening of the current collector screen, that material is capable of moving through the opening. An example of this is having the un-cohesive active material in a powdered form. Then, according to the present invention, this active material is rendered incapable of communication through the current collector by providing it in a cohesive state. A cohesive state is defined as the active particles being held together firmly as part of the same mass, sticking together tightly, or having the particles of a body united throughout the mass. Examples of a cohesive state include providing the one active material being in a pressed pellet or in a sheet form.

A method of providing an active material in a sheet form is described in U.S. Pat. Nos. 5,435,874 and 5,571,640, both to Takeuchi et al. and both assigned to the assignee of the present invention and incorporated herein by reference. These patents teach taking ground cathode active starting materials mixed with conductive diluents and a suitable binder material, and suspending the admixture in a solvent to form a paste. The admixture paste is fed into rollers to form briquettes or pellets, and then fed to rolling mills to produce the cathode active material in a sheet form. The sheet is finally dried and punched into blanks or plates of a desired shape.

Pellets are provided by pressing an active mixture under a pressure of about 0.1 ton/cm² to about 4 tons/cm², as is well known by those skilled in the art. Exemplary active materials and formulations which are readily capable of being pressed into a pellet form include, by weight, 91% SVO, 3% PTFE, 2% KETJENBLACK and 1% graphite; 91% $CF_x$, 4% PTFE and 5% Shawenigan Acetylene Black; 98% $CF_x$, 1% PTFE and 1% Shawenigan Acetylene Black; 100% SVO; 100% $Ag_2O$; and 100% AgO.

The other active material is comprised of particles that even when they are in an un-cohesive state, they are incapable of moving through the at least one opening in the current collector screen. In that respect, the other active material is provided in the form of a pellet or a sheet or of a powder of particles sized too large to move through the current collector opening.

According to the present invention, the sandwich electrode is formed by pressing an assembly of the two active materials on opposite sides of an intermediate current collector from either a direction of the first cathode active material to the second active material, or visa versa. Since the one active material which could communicate through the current collector were it in an un-cohesive state is, in fact, in a cohesive form, and the other active material is incapable of communication through the current collector, whether or not it is in a cohesive form, the possibility of contaminating of either current collector/active material interface is eliminated.

Electrode structures of the present invention include the following:

first electrode active material/current collector screen/
  second active material/current collector screen/first electrode active material, wherein the first and second electrode active materials are different, or first electrode active material/current collector screen/ second electrode active material/second electrode active material/current collector screen/first electrode active material, wherein the first and second electrode active materials are different.

Another embodiment of the present invention has the following configuration:

first electrode active material/current collector screen/first electrode active material/second active material/first electrode active material/current collector screen/first electrode active material, wherein the first and second electrode active materials are different.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, tonically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, tonically conductive salt serves as the vehicle for migration of the anode ions to intercalate or react with the cathode active material. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. In the present primary cell, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

A preferred electrolyte for a secondary cell according to the present invention comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/ discharge cycling behavior at temperatures below −40° C.

The assembly of the cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/ terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of the exemplary secondary cell of the present invention. As is well known to those skilled in the art, the present secondary electrochemical systems can also be constructed in case-positive configuration.

It is appreciated that various modifications to the inventive concepts described herein may be apparent to those of ordinary skill in the art without departing from the spirit and scope of the present invention as defined by the appended claims.

What is claimed is:

1. A method for manufacturing an electrode for an electrochemical cell, comprising the steps of:
   a) positioning a first electrode active material into a pressing fixture;
   b) positioning a first current collector screen on top of the first electrode active material;
   c) positioning a second electrode active material different than the first electrode active material on top of the first current collector screen, thereby forming an electrode assembly; and
   d) pressing the electrode assembly to form the electrode.

2. The method of claim 1, wherein with the first electrode active material comprising first active particles in an un-cohesive state not being firmly held together as part of a mass and of a first size less than a second size of at least one opening of the first current collector screen, the first electrode active particles are capable of moving through the at least one second sized opening, and providing the first electrode active particles in a cohesive form firmly held together as part of the same mass and incapable of moving through the at least one second sized opening in the first current collector screen and further providing the second electrode active material in a form incapable of moving through the at least one second sized opening in the first current collector screen, and pressing the electrode assembly from the direction of either the first electrode active material to the second electrode active material or from the direction of the second electrode active material to the first electrode active material.

3. The method of claim 1 including providing the second electrode active material in a form selected from the group consisting of a powder form, a pellet form and a sheet form.

4. The method of claim 1 wherein the first electrode active particles are not a powder in their cohesive form firmly held together as part of the same mass.

5. The method of claim 1 including providing the electrode as a cathode having the configuration: silver vanadium oxide/current collector screen/$CF_x$.

6. The method of claim 1 including providing the electrode assembly further comprising:
   a) positioning a second current collector screen on top of the second electrode active material;
   b) positioning a third electrode active material on top of the second current collection screen, thereby forming the electrode assembly; and
   c) pressing the electrode assembly to form the electrode.

7. The method of claim 6 including selecting the first, the second and the third electrode active materials from the group consisting of $CF_x$, $C_2F$, $Ag_2O$, $Ag_2O_2$, $CuF$, $Ag_2CrO_4$, $MnO_2$, silver vanadium oxide, copper silver vanadium oxide, $V_2O_5$, $LiCoO_2$, $LiNiO_2$, $LiMn_2O_4$, $CuO_2$, $TiS_2$, $Cu_2S$, FeS, $FeS_2$, copper oxide, copper vanadium oxide, and mixtures thereof.

8. The method of claim 6 wherein the first and the third electrode active materials are the same and they are a different electrode active material than the second electrode active material.

9. The method of claim 6 including providing the electrode as a cathode having the configuration: silver vanadium oxide/current collector screen/$CF_x$/current collector screen/silver vanadium oxide.

10. The method of claim 6 wherein with the third electrode active material comprising third active particles in an un-cohesive state not being firmly held together as part of a mass and of a third size less than a fourth size of at least one opening of the second current collector screen, the third electrode active particles are capable of moving through the at least one fourth sized opening, and including providing the third electrode active particles in a cohesive form firmly held together as part of the same mass and incapable of moving through the at least one fourth sized opening in the second current collector screen.

11. A method for providing an electrode for an electrochemical cell, comprising the steps of:
   a) positioning a first electrode active material into a pressing fixture;
   b) positioning a first current collector screen on top of the first electrode active material;
   c) positioning a second electrode active material on top of the first current collector screen, wherein with the first electrode active material comprising first active particles in an un-cohesive state not being firmly held together as part of a mass and of a first size less than a second size of at least one opening of the first current collector screen, the first electrode active particles are capable of moving through the at least one second sized opening, and providing the first electrode active particles in a cohesive form firmly held together as part of the same mass and incapable of moving through the at least one second sized opening in the first current collector screen, and further providing the second electrode active material in a form incapable of moving through the at least one second sized opening in the first current collector screen;
   d) positioning a second current collector screen on top of the second electrode active material;
   e) positioning a third electrode active material on top of the second current collection screen, thereby forming an electrode assembly, wherein with the third electrode active material comprising third active particles in an un-cohesive state not being firmly held together as part of a mass and of a third size less than a fourth size of at least one opening of the second current collector screen, the third electrode active particles are capable of moving through the at least one fourth sized opening, and providing the third electrode active particles in a cohesive form firmly held together as part of the same mass and incapable of moving through the at least one fourth sized opening in the second current collector screen; and
   f) pressing the electrode assembly from the direction of either the first electrode active material to the third electrode active material or from the direction of the third electrode active material to the first electrode active material to form the electrode.

12. The method of claim 11 including providing the second electrode active material selected from the group consisting of a powder form, a pellet form and a sheet form.

13. The method of claim 11 including selecting the first and second current collector screens from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

14. The method of claim 11 including providing the first and second current collectors as titanium having a coating selected from the group consisting of a graphite/carbon material, iridium, iridium oxide, and platinum provided thereon.

15. The method of claim 11 including providing the electrode as a cathode having the configuration: silver vanadium oxide/current collector screen/$CF_x$.

16. The method of claim 11 including providing the first and third electrode active materials being the same and different than the second electrode active material.

17. The method of claim 11 including providing the electrode as a cathode having the configuration: silver vanadium oxide/current collector screen/$CF_x$/current collector screen/silver vanadium oxide.

18. The method of claim 11 including selecting the first, second and third electrode active materials from the group consisting of $CF_x$, $C_2F$, $Ag_2O_2$, $CuF$, $Ag_2CrO_4$, $MnO_2$, silver vanadium oxide, copper silver vanadium oxide, $V_2O_5$, $LiCoO_2$, $LiNiO_2$, $LiMn_2O_4$, $CuO_2$, $TiS_2$, $Cu_2S$, $FeS$, $FeS_2$, copper oxide, copper vanadium oxide, and mixtures thereof.

* * * * *